United States Patent [19]

King

[11] Patent Number: 4,606,089
[45] Date of Patent: Aug. 19, 1986

[54] GROUND WORKING IMPLEMENT ASSEMBLY

[76] Inventor: Garry L. King, 3641 Baumberger Rd., Stow, Ohio 44224

[21] Appl. No.: 732,450

[22] Filed: May 9, 1985

[51] Int. Cl.$^4$ .............................................. B25F 1/02
[52] U.S. Cl. ..................................... 7/114; 56/400.04; 172/375; 294/51
[58] Field of Search ................... 7/114, 115, 116, 167, 7/170; 56/400.04, 400.05, 400.19; 172/375; 294/24, 51, 52

[56] References Cited

U.S. PATENT DOCUMENTS

| | | | |
|---|---|---|---|
| 199,481 | 1/1878 | Thomas | 172/375 |
| 334,438 | 1/1886 | Heston . | |
| 588,757 | 8/1897 | Simmons | 56/400.05 |
| 612,527 | 10/1898 | Mueller . | |
| 935,473 | 9/1909 | Doidge | 56/400.05 |
| 986,761 | 3/1911 | Roscoe . | |
| 1,504,913 | 8/1924 | Simoncelli . | |
| 1,570,189 | 1/1926 | Sturm . | |
| 2,279,324 | 4/1942 | Julien | 294/57 |
| 2,377,730 | 6/1945 | Vosbikian et al. | 7/16 |
| 2,606,050 | 8/1952 | Morris et al. | 172/375 |
| 2,794,689 | 6/1957 | Rubrum | 172/375 |
| 2,796,011 | 6/1957 | Schmidt | 172/375 |
| 3,221,485 | 12/1965 | Jenkins | 56/400.06 |
| 4,476,939 | 10/1984 | Wallace | 7/116 |

FOREIGN PATENT DOCUMENTS 1454223 11/1976 United Kingdom .................... 7/116

Primary Examiner—Roscoe V. Parker
Attorney, Agent, or Firm—Renner, Kenner, Greive, Bobak & Taylor

[57] ABSTRACT

A ground working implement assembly having a handle (11) and a plurality of implement heads (13, 14, 15, 16 and 17). Each implement head has a ground working member (13A, 14A, 15A, 16A and 17A) and a tang (13B, 14B, 15B, 16B and 17B). One end of the handle (11) has a socket assembly (20) adapted to receive the tang of an implement head. A retaining pin (31) removably secures the tang of an implement to the socket assembly (20) when the tang is received thereby. The implement heads (13, 14, 15, 16 and 17) are configured so that they are nestable with each other for storage.

6 Claims, 8 Drawing Figures

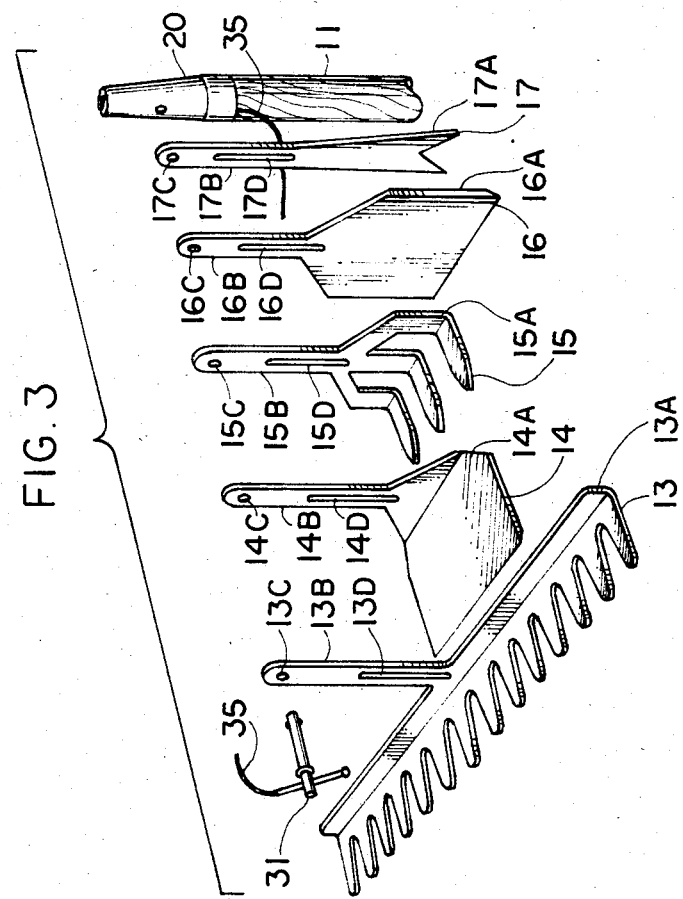
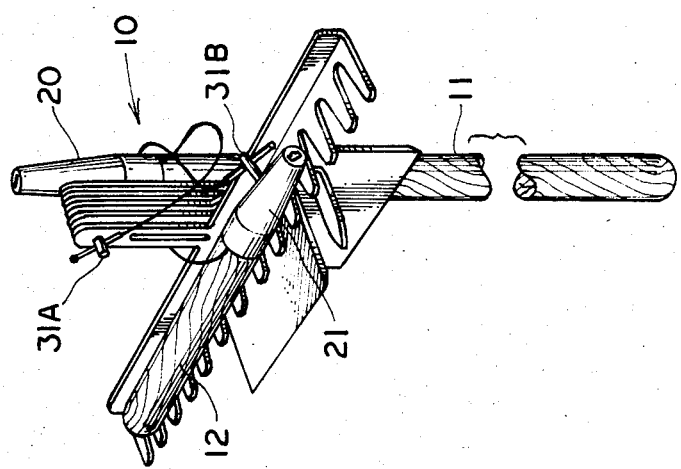

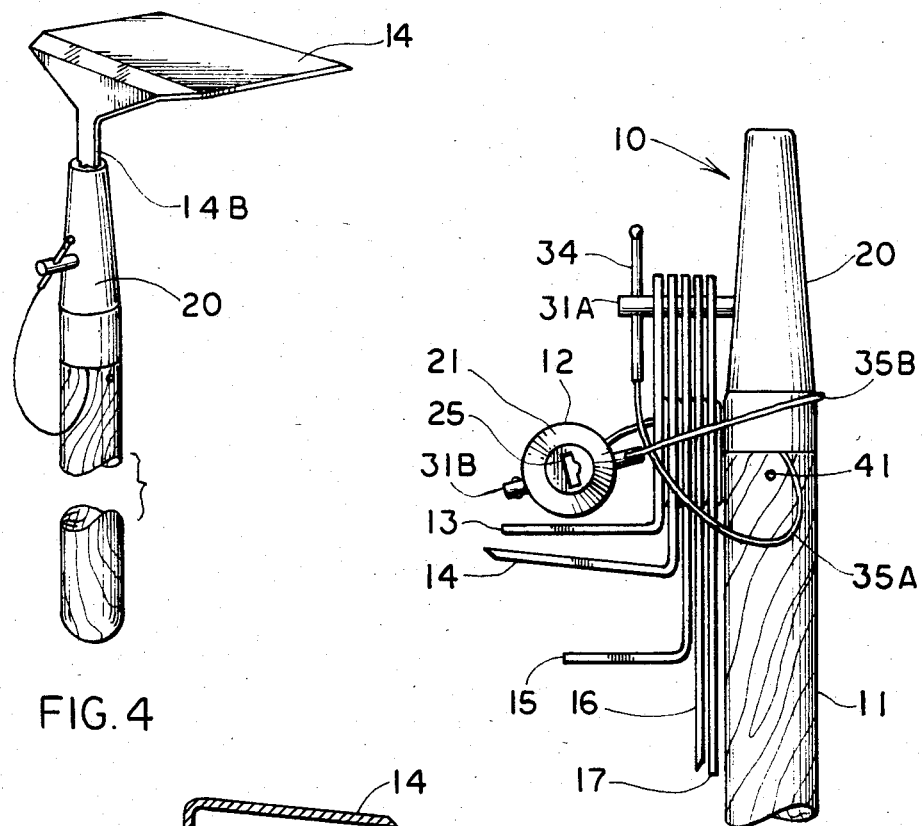
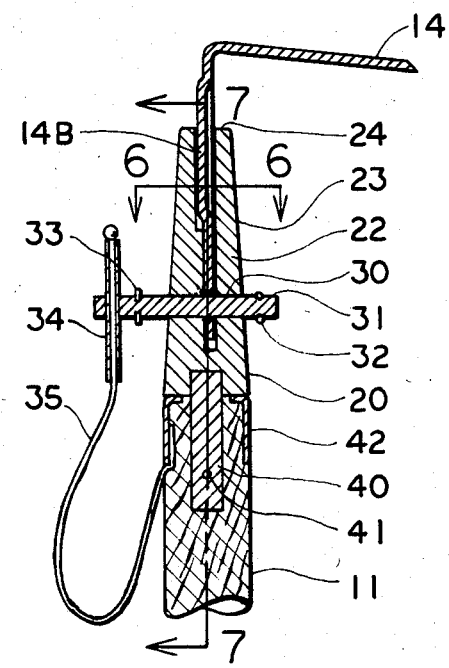
FIG. 4
FIG. 2
FIG. 5

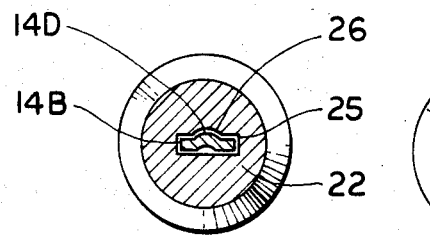 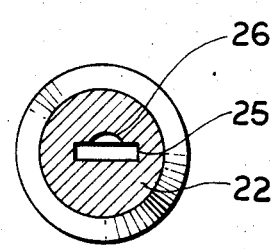
FIG. 6A    FIG. 6B
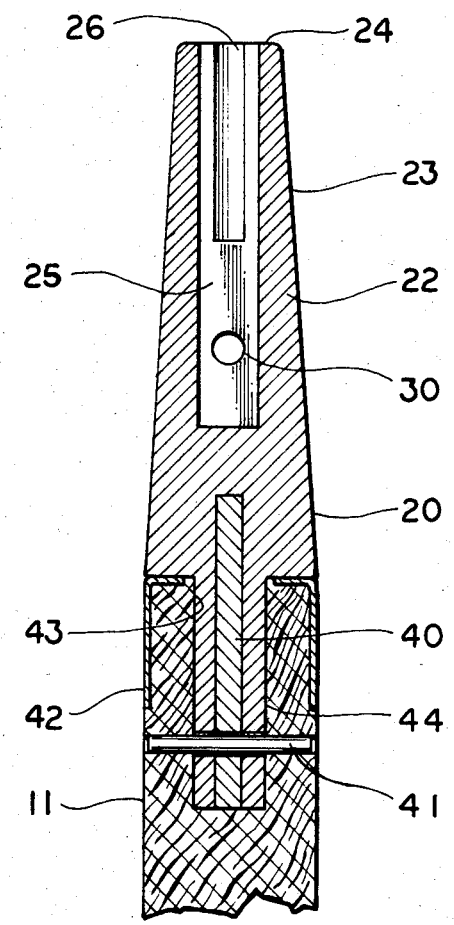
FIG. 7

GROUND WORKING IMPLEMENT ASSEMBLY

TECHNICAL FIELD

The present invention relates generally to a ground working implement assembly. More particularly, the present invention pertains to a ground working implement assembly employing a plurality of interchangeable tool heads. Specifically, the present invention is directed to a ground working implement assembly wherein a plurality of interchangeable tool heads can be individually secured to a handle for a particular ground working function and wherein the plurality of heads can be nestably secured collectively to a handle for storage.

BACKGROUND ART

It is well known that a wide variety of implements are generally required when working in a garden or maintaining a lawn. The soil may need to be dug or tilled; clods of soil may need to be broken; and the surface may need to be leveled. These various steps require the use of different tools to perform the various ground working functions. A shovel or a hoe may be used to dig or till the soil. A cultivator may be used to break clods of soil. A rake may be used to level the surface. Furthermore, additional functions, such as weeding and the like, may yet require additional implements.

These various tools, while all readily available to the public, have generally required a suitable area or facility to store them—such as a tool shed. However, with the ever-increasing popularity of condominiums and townhouses as residences, storage space is at a premium. Thus, while people living in these residences may wish to have a personal garden or lawnscape, it is all but impossible to conveniently store the needed ground working implements to maintain the same. Furthermore, while efforts may have been made to develop ground working implements having interchangeable tool heads, these have proven ineffective as they fail to provide a compact storage assembly to maintain the components together when not in use. This results in the eventual loss of one or more of the tool heads.

DISCLOSURE OF THE INVENTION

It is therefore an object of the present invention to provide a ground working implement assembly suitable for performing a variety of ground working functions.

It is another object of the present invention to provide a ground working implement assembly, as above, that employs a plurality of interchangeable tool heads thereby providing a relatively space-saving assembly.

It is still another object of the present invention to provide a ground working implement assembly, as above, wherein the interchangeable tool heads are nestable with each other so that they can be compactly arranged and maintained with the assembly for storage.

These and other objects of the invention, as well as the advantages thereof over existing and prior art forms, which will be apparent in view of the following specification, are accomplished by means hereinafter described and claimed.

In general, a ground working implement assembly according to the concept of the present invention incorporates a plurality of implement heads, each having a ground working member and a tang. The assembly also incorporates a handle having, on one end thereof, a socket assembly adapted to receive the tang of an implement head. Means are provided to removabley secure the tang of an implement to the socket assembly when the tang is received thereby. The implement heads are configured so that they are nestable with each other for storage.

A preferred embodiment of a ground working implement assembly incorporating the concept of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a fragmentary perspective view of a ground working implement assembly embodying the concept of the present invention, assembled in nested relation for storage when not in use;

FIG. 2 is an enlarged fragmentary side elevational view of the ground working implement assembly depicted in FIG. 1;

FIG. 3 is a fragmentary exploded perspective view of the ground working implement assembly depicted in FIG. 1;

FIG. 4 is a fragmentary perspective view of the ground working implement assembly of FIG. 1 assembled to perform a ground working function;

FIG. 5 is an enlarged fragmentary, longitudinal cross section of the ground working implement assembly depicted in FIG. 4;

FIGS. 6A and 6B are enlarged cross sections taken substantially along line 6—6 of FIG. 5; and, FIG. 7 is an enlarged fragmentary cross section taken substantially along line 7—7 of FIG. 5, with the ground working implement head removed.

PREFERRED MODE FOR CARRYING OUT THE INVENTION

A ground working implement assembly according to the concept of the present invention is indicated generally by the numeral 10 in FIG. 1 of the attached drawings. Particularly, the assembly 10 is depicted in a nested relation for storage. As more clearly depicted in FIGS. 2 and 3, in conjunction with FIG. 1, the components of the assembly 10 include a long handle 11 and a short handle 12, which is structurally identical to long handle 11, a rake head 13, a hoe head 14, a cultivator head 15, a chisel head 16 and a weeder head 17.

With respect to the handles, long handle 11 is approximately 4 to 5 feet (1.22 to 1.52 meters) in length while the short handle is approximately only one foot (0.30 meter) in length. Each handle, 11 and 12, has at one end thereof a socket assembly 20 and 21, respectively, which is adapted to secure an implement head to the handle. The handles, 11 and 12, are preferably made of wood or similar material as generally employed in ground working hand tools. Socket assemblies, 20 and 21, are preferably made of a rigid, impact resistant material. Although metal is acceptable, it is more preferable for socket assemblies, 20 and 21, to be constructed of an impact resistant plastic, such as nylon, as this will be of substantially less weight. Inasmuch as the handles 11 and 12, with the socket assemblies, 20 and 21, respectively, are essentially identical to each other, but for a difference in the length, discussion will hereinafter be directed to the implement assembly 10 employing long handle 11, with the understanding that such discussion is equally applicable to short handle 12, unless otherwise indicated.

With reference to FIG. 3, each implement head has a ground working member—the rake tines 13A, the hoe blade 14A, the cultivator tines 15A, the chisel blade 16A, and the weeder blade 17A—which is suitable for performing particular ground working functions. Each implement head also has a tang member, 13B, 14B, 15B, 16B and 17B, which is adapted to be received within socket assembly, 20 or 21, of handle, 11 or 12, respectively. Each tang member has a hole, 13C, 14C, 15C, 16C and 17C, and a reinforcing boss, 13D, 14D, 15D, 16D and 17D, for securement to the socket assembly, 20 or 21, and for rigidity.

An exemplary assembly of hoe head 14 to socket assembly 20 is depicted in FIGS. 4 and 5. Specifically, socket assembly 20 includes a receptacle end 22 having a configuration of a truncated cone with a tapered exterior surface 23 terminating in a circular end wall 24. A substantially rectangular slot 25 extends axially into receptacle end 22 from end wall 24 as depicted in FIGS. 6A and 6B. One of the broad walls of slot 25 has a recess 26 therein extending approximately one-half the length of slot 25, as depicted in FIGS. 6 and 7. Recess 26 is adapted to receive boss 14D on tang 14B of hoe head 14, as depicted in FIG. 6A. This arrangement, of course, is applicable to any implement head employing a similar tang.

A cross bore 30 extends radially through receptacle end 22 in the vicinity of slot 25. Cross bore 30 is adapted to removably receive a retaining pin 31 as depicted in FIG. 5. Retaining pin 31 is preferably a hardened metal pin having a ball detent 32 at its tip and an annular shoulder ring 33 in proximity of a T-handle 34. It should be appreciated that retaining pin 31 can be selectively inserted into, and removed from, cross bore 30 using firm pushing, or pulling, force to overcome the resistance of ball detent 32. Similarly, ball detent 32 will prevent retaining pin 31 from unintentionally coming out of cross bore 30. A retaining cable 35 is affixed to handle 11 and secures retaining pin 31 thereto.

Socket assembly 26 is secured to handle 11 through the use of a wedge 40 and cross pin 41 arrangement. Specifically, a metal collar 42 is secured about the outer periphery of handle 11 at one end thereof. An axial bore 43 passes through collar 42 and into handle 11 and is sized to receive the stem 44 of socket assembly 20.

Stem 44 is axially slotted to receive wedge 40 as depicted in FIG. 7. Wedge 40 is preferably made of a rigid metal and extends axially through stem 44 and into receptacle end 22, thereby providing considerable reinforcement throughout the region and radially expanding stem 44.

Stem 44 is secured into bore 43 in a press fit manner. Cross pin 41, thereafter, further secures wedge 40 and stem 44 to handle 11. Such an arrangement assures that socket assembly 20 will remain fixedly secured to handle 11, even after prolonged use. Furthermore, wedge 40 and collar 42 provide substantial reinforcement to the union of socket assembly 20 and handle 11.

The nestable storage feature of the implement assembly 10 may be more fully appreciated by considering FIGS. 1 and 2. Specifically, the implement heads are suitably sized and configured so that they each will nest in a prearranged order with holes thereof properly aligned to receive retaining pin 31. The boss on each tang is suitably configured so that the protrusion on one side of the tang of one implement nests with the recess on the tang of the next adjacent implement. This facilitates alignment of the holes in the tangs and further aids in maintaing the nested configuration once so assembled.

In the exemplary embodiment herein disclosed, the prearranged order for nesting of the implements is depicted in FIGS. 2 and 3. Specifically, weeder head 17 is positioned adjacent handle 11 as it has the greatest overall length of the implement handle. Chisel head 16 is positioned adjacent weeder head 17, with cultivator head 15 positioned adjacent thereto. Hoe head 14 is substantially shorter in length than cultivator head 15, as depicted in FIG. 2, so as to be nestable therewith. Similarly, rake head 13 is nestable with hoe head 14.

When so arranged, retaining pin 31A passes through the aligned holes of all the implements and into cross bore 30 of socket assembly 20. Although not passing completely through socket assembly 20, retaining pin 31A is secured thereto because ball detent 32 extends at least into slot 25. It should be appreciated, therefore, that retaining pin 31A is suitably retained in socket assembly 20 so as to secure the nested implements to socket assembly 20.

Short handle 12 is thereafter secured to the nested arrangement by being positioned on rake head 13. Retaining cable 35B of small handle 12 is intertwined with retaining cable 35A of long handle 11; and, retaining pin 31B of small handle 12 is secured into socket assembly 21, thereby securing short handle 12 to long handle 11.

Thus it should be recognized that a ground working implement assembly embodying the concept of the invention disclosed herein is capable of performing a wide variety of ground working functions and provides a compact assembly for convenient storage. Moreover, it should be recognized that modifications to the assembly can be made—such as including additional implement heads to perform other ground working functions—without departing from the invention concept of the invention. Accordingly, the ground working implement assembly disclosed herein carries out the various objects of the invention and otherwise constitutes an advantageous contribution to the art.

I claim:

1. A ground working implement assembly comprising:
    a plurality of removable implement heads, each said head having a ground working member and a tang having a reinforcing boss therein, said boss defining a protrusion on one side of said tang and a corresponding recess on the opposite side of said tang;
    handle means, one end of said handle means having socket means adapted to receive said tang of a said implement head; and
    means for removably securing said tang of said implement head to said socket means when said tang is received thereby;
    said implement heads being nestable with each other for storage with said tang of one said implement head in juxtaposition with said tang of a next adjacent said implement head whereby said protrusion of said one implement head nests with said recess of said next adjacent implement head.

2. An assembly according to claim 1, wherein said means for removably securing further removably secures said implement heads to said handle means when said implement heads are nestably arranged.

3. An assembly according to claim 2, wherein said socket means comprise a socket assembly affixed to said handle means and having a slot therein for receiving said tang of said implement and a cross bore passing through said socket assembly and intersecting said slot.

4. An assembly according to claim 3, wherein said tang of each said implement head has a hole therein alignable with said cross bore, said means for removably securing comprising a retaining pin receivable in said cross bore and engageable with said hole of said tang when said hole is aligned with said cross bore.

5. An assembly according to claim 4, wherein said implement heads comprise a weeder head, a chisel head, a cultivator head, a hoe head and a rake head.

6. An assembly according to claim 5 wherein said chisel head is nestable with said weeder head, said cultivator head is nestable with said chisel head, said hoe head is nestable with said cultivator head, and said rake head is nestable with said hoe head, said hole of said tang of each said implement head being aligned with said hole of said tang of each other said implement heads.

* * * * *

UNITED STATES PATENT AND TRADEMARK OFFICE
CERTIFICATE OF CORRECTION

PATENT NO. : 4,606,089
DATED : August 19, 1986
INVENTOR(S) : Garry L. King

It is certified that error appears in the above-identified patent and that said Letters Patent are hereby corrected as shown below:

Col. 3, Line 35, after "proximity" delete "of" and substitute therefor --to--.

Col. 4, Line 10, after "implement" delete "handle" and substitute therefor --heads--.

Signed and Sealed this

Fourth Day of November, 1986

[SEAL]

*Attest:*

DONALD J. QUIGG

*Attesting Officer*   *Commissioner of Patents and Trademarks*